United States Patent [19]

Yamazaki

[11] Patent Number: 4,525,437
[45] Date of Patent: Jun. 25, 1985

[54] LIGHT ENERGY CONVERSION SYSTEM

[75] Inventor: Shunpei Yamazaki, Tokyo, Japan

[73] Assignee: Semiconductor Energy Laboratory Co., Ltd., Japan

[21] Appl. No.: 479,561

[22] Filed: Mar. 28, 1983

[30] Foreign Application Priority Data

Mar. 29, 1982 [JP] Japan .................................. 57-50534

[51] Int. Cl.³ .............................................. H01M 6/36
[52] U.S. Cl. .................................... 429/111; 204/263; 204/275
[58] Field of Search ................ 429/111; 204/257, 263, 204/275, 129

[56] References Cited

U.S. PATENT DOCUMENTS

| | | | |
|---|---|---|---|
| 4,021,323 | 5/1977 | Kilby et al. | 204/129 |
| 4,128,704 | 12/1978 | McKinzie et al. | 429/111 |
| 4,381,233 | 4/1983 | Adachi et al. | 204/242 |
| 4,388,482 | 6/1983 | Hamakawa et al. | 136/258 AM |

FOREIGN PATENT DOCUMENTS

| | | | |
|---|---|---|---|
| 52-12693 | 1/1977 | Japan | 429/111 |
| 54-11450 | 1/1979 | Japan | 429/111 |

OTHER PUBLICATIONS

R. Williams, "Schottky Barriers at the Interface Between Amorphous Silicon and Electrolytes", *J. Appl. Physics*, vol. 50, pp. 2848–2851 (1979).

A. J. Nozik, "Photochemical Diodes", *Appl. Phys. Lett.*, vol. 30, pp. 567–569 (1977).

J. Manassen et al., "Electrochemical, Solid State, Photochemical & Technological Aspects of Photoelectrochemical Energy Converters", *Nature*, vol. 263, Sep. 1976.

M. S. Wrighton, "Photochemistry", *Chem. & Eng. News*, Sep. 3, 1979, p. 37.

*Primary Examiner*—Aaron Weisstuch
*Attorney, Agent, or Firm*—Murray, Whisenhunt & Ferguson

[57] ABSTRACT

A semiconductor photoelectric conversion structure having a PIN junction is assembled as a unitary structure with a redox reaction chamber, with the P (or N) type semiconductor layer of the former being heavily doped and held in contact with an electrolytic solution contained in a second cell with an electrolytic solution contained in a second cell of the redox reaction chamber. By interconnecting a second electrode connected to the N (or P) type semiconductor structure and a first electrode in contact with an electrolytic solution contained in a first cell of the redox reaction chamber, the electrolytic solutions in the first and second cells store chemical energy converted from electrical energy obtained from light energy by means of the semiconductor photoelectric conversion structure. Furthermore, electric power may be obtained across the first electrode and a third electrode connected with the P (or N) type semiconductor layer of the semiconductor photoelectric conversion structure.

11 Claims, 4 Drawing Figures

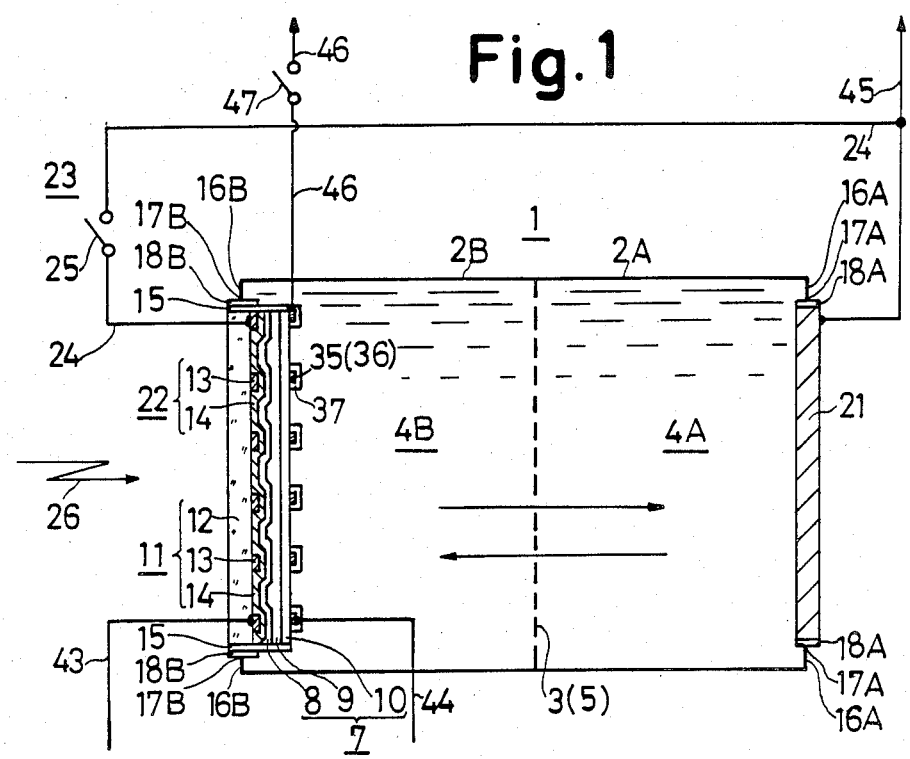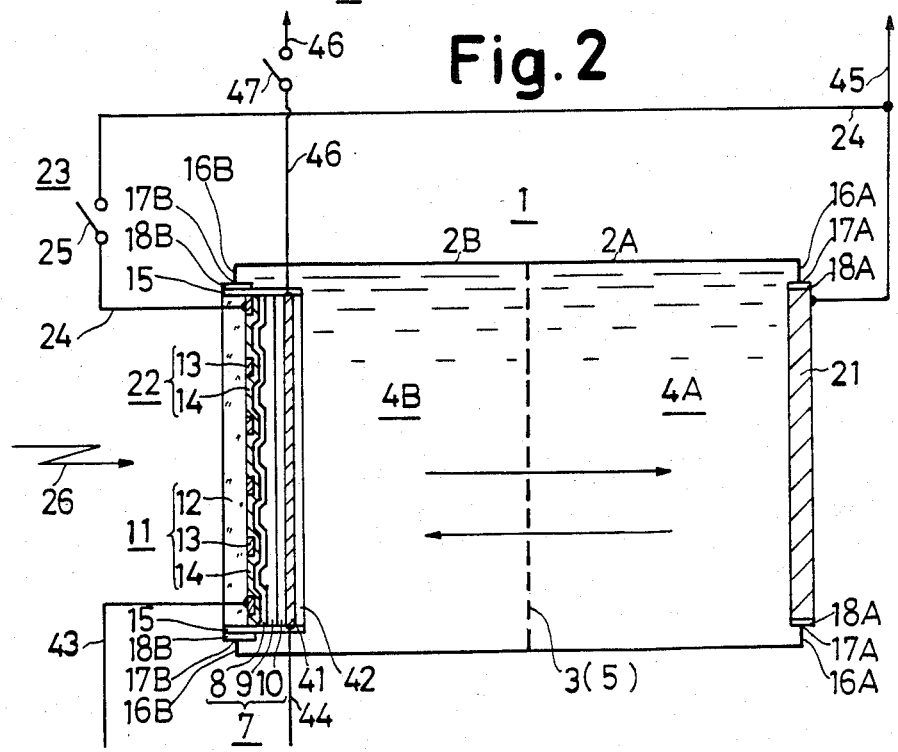

LIGHT ENERGY CONVERSION SYSTEM

BACKGROUND OF THE INVENTION

1. Field of the Invention

The present invention relates to a light energy conversion system and, more particularly, to a light energy conversion system which converts light energy into electrical energy and converts it into chemical energy through the use of a redox reaction system and then reconverts the chemical energy into electrical energy through the redox reaction system.

2. Description of the Prior Art

Heretofore there have been proposed various light energy conversion systems of this type, which are usually provided with a semiconductor photoelectric conversion structure for converting light energy into electrical energy, a redox reaction system for converting the electrical energy obtained from the semiconductor photoelectric conversion structure into a chemical energy and for converting the chemical energy into electrical energy, first and second electrodes held in contact with the aqueous solution in the redox reaction system, and first and second connecting means for electrically interconnecting a pair of electrodes of the semiconductor photoelectric conversion structure and the first and second electrodes of the redox reaction system.

Such prior art light energy conversion systems are bulky as a whole because the semiconductor photoelectric conversion structure and the redox reaction system are provided separately of each other.

Furthermore, the conventional systems require first and second electrodes for the redox reaction system and necessitate, as means for electrically interconnecting the semiconductor photoelectric conversion structure and the redox reaction system, two electric connecting means for use in converting electrical energy into chemical energy and two electric connecting means for use in converting chemical energy into electrical energy. Accordingly, the prior art light energy conversion systems are disadvantageous in that they involve the use of a large number of parts and require much time for electrically interconnecting the electrode of the semiconductor photoelectric conversion structure and the electrode held in contact with the electrolytic solution of the redox reaction system.

SUMMARY OF THE INVENTION

It is therefore an object of the present invention to provide a novel light energy conversion system which is free from the abovesaid defects of the prior art.

Briefly stated, the light energy conversion system of the present invention comprises a redox reaction chamber provided with first and second cells intercommunicating through an ion bridge and containing first and second electrolytic solutions, respectively; a semiconductor photoelectric conversion structure having a first semiconductor layer of a P or N first conductivity type, an I type (intrinsic) second semiconductor layer formed on the first semiconductor layer, and a third semiconductor layer of second conductivity type opposite that of the first conductivity type of the first semiconductor layer, formed on the second semiconductor layer and held in contact with the second electrolytic solution in the second cell of the redox reaction chamber on the side opposite that facing the second semiconductor layer; a first electrode in contact with the first electrolytic solution contained in the first cell of the redox reaction chamber; a second electrode connected to the first semiconductor layer of the photoelectric conversion semiconductor structure and paired with the first electrode; a third electrode connected to the third semiconductor layer of the semiconductor photoelectric conversion structure and paired with the first electrode; and electric connecting means for electrically interconnecting the first and second electrode.

According to the light energy conversion system of the present invention, when the semiconductor photoelectric conversion structure is exposed to irradiation by light, a voltage is generated between the third semiconductor layer of the photoelectric conversion semiconductor structure and the second electrode. At the same time the first electrode is in contact with the first electrolytic solution contained in the first cell of the redox reaction chamber, and the third semiconductor layer of the semiconductor photoelectric conversion structure is in contact with the second electrolytic solution in the second cell of the redox reaction chamber, the third semiconductor layer serving as an electrode paired with the first electrode.

Accordingly, by electrically connecting the first and second electrodes, a first redox reaction, which is either one of anodic oxidation reaction and cathodic reduction reaction, occurs within the first cell of the redox reaction chamber and, in the second cell, a second redox reaction occurs which is opposite that of the first redox reaction.

As a result of this, electrical energy available from the semiconductor photoelectric conversion structure by dint of photoelectric conversion can be converted by the first and second electrolytic solutions in the first and second cells into chemical energy and stored therein.

By connecting a load between the first and third electrodes, the aforesaid second and first redox reactions occur in the first and second cells, respectively.

In this case, chemical energy stored in the first and second electrolytic solutions in the first and second cells can be supplied to the load after being converted into electrical energy.

In this way, the light energy conversion system of the present invention exhibits the light energy converting process of converting light energy into electrical energy converting the electrical energy into chemical energy, and then reconverting the chemical energy into electrical energy.

According to the light energy conversion system of the present invention, the semiconductor photoelectric conversion structure and the redox reaction chamber are assembled together as a unitary structure, with the third semiconductor layer of the semiconductor photoelectric conversion structure held in contact with the second electrolytic solution contained in the second cell of the redox reaction chamber. Therefore, the light energy conversion system of the present invention can be made compact as compared with the aforementioned conventional light energy conversion systems.

Besides, according to the light energy conversion system of the present invention, only the first electrode which is held in contact with the electrolytic solution contained in the redox reaction chamber makes contact with the first electrolytic solution in the first cell of the redox reaction chamber. Moreover, the electric connecting means which contacts the semiconductor photoelectric conversion structure and the electrolytic solution contained in the redox reaction chamber may simply by means for electrically connecting the first and second electrodes. Accordingly, as compared with the prior art systems, the system of the present invention has the advantages that the number of parts used is small and the electrical connection of the semiconductor photoelectric conversion structure and the electrode in contact with the electrolytic solution in the redox reaction chamber is less troublesome and time-consuming.

Other objects, features and advantages of the present invention will become more fully apparent from the following description taken in conjunction with the accompanying drawings.

BRIEF DESCRIPTION OF THE DRAWINGS

FIG. 1 is a sectional view schematically illustrating a first embodiment of the light energy conversion system of the present invention;

FIG. 2 is a sectional view schematically illustrating a second embodiment of the light energy conversion system of the present invention;

DESCRIPTION OF THE PREFERRED EMBODIMENTS

Figure 3:
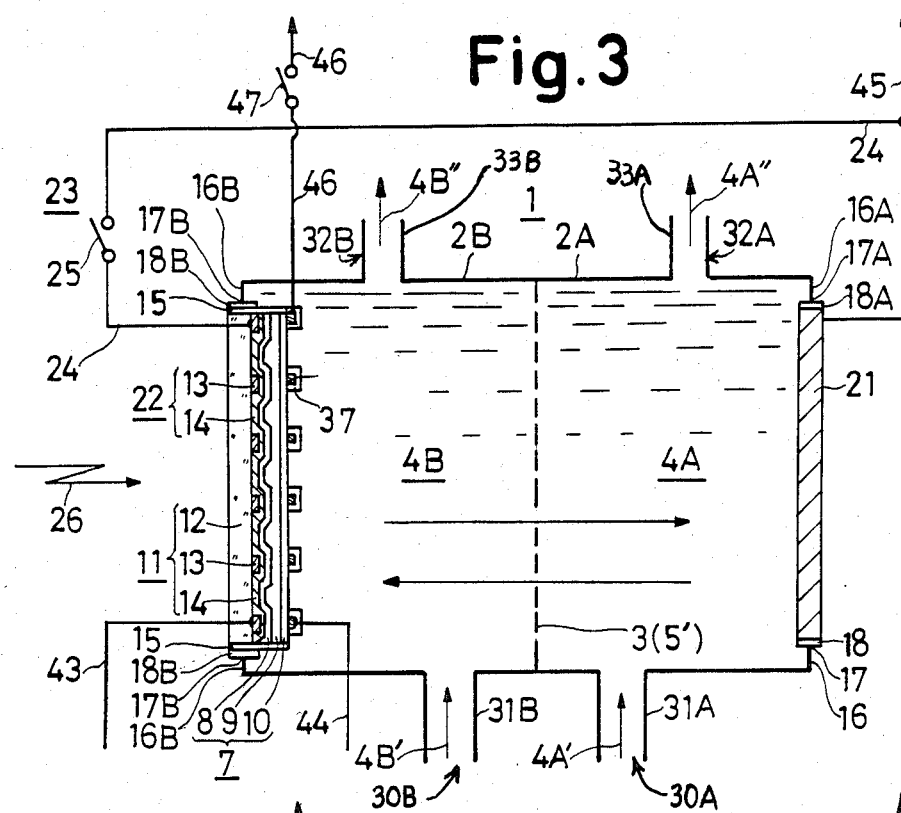
FIG. 3 is a sectional view schematically illustrating a third embodiment of the light energy conversion system of the present invention.

FIG. 1 illustrates in section a first embodiment of the light energy conversion system of the present invention, which is provided with a redox reaction chamber 1.

The reaction chamber 1 comprises first and second cells 2A and 2B, which intercommunicate through an ion bridge 3 and have introduced thereinto first and second electrolytic solutions 4A and 4B, respectively.

The ion bridge 3 is formed by a known ion exchange membrane 5.

As the electrolytic solutions 4A and 4B contained in the first and second cells 2A and 2B, there can be employed various known electrolytic solutions which are used in redox reaction systems.

For example, the following electrolytic solution can be used, which employs a nonaqueous solvent which is acetonitrile, expressed by $$CH_3CN \tag{1}$$

or propylene carbonate, expressed by $$\begin{array}{c} CH_3-CH\!\!-\!\!-\!\!CH_2 \\ | \quad\quad\quad | \\ O \quad\quad O \\ \diagdown \!\! \diagup \\ C \\ \| \\ O \end{array} \tag{2}$$

The electrolyte used is a complex salt including a dipyridyl, expressed by

| 2,2'-dipyridyl[$(C_5H_4N)_2$] | (3a) |
| 4,4'-$(CH_3)_2$dipyridyl | (3b) |
| $(NH_3)_4$dipyridyl | (3c) | or

| 5,5'-$(CH_3)_2$dipyridyl | (3d) | or a phenanthroline expressed by

| 1,10(or ortho)phenanthroline | (4a) |
| 4,7-$(C_6H_4SO_3)_2$phenanthroline | (4b) |
| 4,7-$(CH_3)_2$phenanthroline | (4c) | or

| 4,6-$(CH_3)_2$phenanthroline | (4d) | and a metal ion.

The metal ion may be titanium (Ti), vanadium (V), chromium (Cr), manganese (Mn), cobalt (Co), nickel (Ni), or copper (Cu) ion, but it is preferable to employ iron (Fe), ruthenium (Ru) or osmium (Os) ions.

The electrolyte of the electrolytic solution may preferably be a complex salt which includes the following dipyridyl or phenanthroline compounds and the metal ion.

| Fe(dipyridyl)$_3$X$_2$ | (5a) |
| Fe(phenanthroline)$_3$X$_2$ | (5b) |
| Ru(dipyridyl)$_3$X$_2$ | (6a) |
| Ru(phenanthroline)$_3$X$_2$ | (6b) |
| Os(dipyridyl)$_3$X$_2$ | (7a) |
| Os(phenanthroline)$_3$X$_2$ | (7b) | where X is a chlorine peroxide radical, expressed by $(ClO_4)^{2-}$.

According to this electrolytic solution, in the case where the electrolyte is a complex salt of dipyridyl or phenanthroline (identified by R) and the metal ion is iron (Fe), ruthenium (Ru), or osmium (Os) ion (metals of such metal ions being identified by M), there are caused an anodic oxidation reaction (injection of electrons from the electrolytic solution into an electrode), expressed by the following anodic oxidation reaction formulas (8a) or (9a), and a cathodic reduction reaction (injection of electrons from an electrode into the electrolytic solution), expressed by the following cathodic reduction reaction formula (8b) or (9b) ($e^-$ being electron):

| $M(R)_6^{2+} \rightarrow M(dipyridyl)_3^{3+} + e^-$ | (8a) |
| $M(R)_3^{3+} + e^- \rightarrow M(dipyridyl)_3^{2+}$ | (8b) |
| $M(R)_3^+ \rightarrow M(dipyridyl)_3^{2+} + e^-$ | (9a) |
| $M(R)_3^{2+} + e^- \rightarrow M(dipyridyl)_3^+$ | (9b) |

According to this electrolytic solution, since the solvent is acetonitrile or propylene carbonate and since the electrolyte is a complex salt of dipyridyl or phenanthroline with a metal ion, the electrolyte can be dissolved in the solvent in as large a quantity as 0.5 mol% or more.

In the case where the solvent is acetonitrile and the electrolyte is a complex salt of dipyridyl with iron ions, the electrolyte can be dissolved in the solvent in an amount of 2 mol% at room temperature, 4 mol% at 50° C., and 5 mol% at 70° C.

Also, in the case where the solvent is acetonitrile and the electrolyte is a complex salt of phenanthroline with iron, ruthenium, or osmium ions, where the solvent is propylene carbonate and the electrolyte is a complex salt of dipyridyl with iron, ruthenium, or osmium ions, or where the solvent is propylene carbonate and the electrolyte is a complex salt of phenanthroline with iron, ruthenium, or osmium ions, a large quantity of the electrolyte can similarly be dissolved in the solvent, as solvent, as in the case where the solvent is acetonitrile and the electrolyte is a complex salt of dipyridyl with iron ions.

Furthermore, this electrolytic solution permits dissolution of a large amount of electrolyte in the solvent, and hence has a high degree of electric conductivity.

In the case where the solvent is acetonitrile, the electrolyte is a complex salt of dipyridyl with iron ions and the electrolyte is dissolved in the solvent in the amount of 2 mol% at room temperature, 4 mol% at 50° C., and 5 mol% at 70° C., respectively, as described above, and the electrolytic solutions electric conductivities as high as $5 \times 10^{-2} (\Omega cm)^{-1}$ at room temperature, 3 to $7 \times 10^{-1}$ $(\Omega cm)^{-1}$ at 50° C. and, 1 to 5 $(\Omega cm)^{-1}$ at 70° C., respectively.

Also, in the case where the solvent is acetonitrile and the electrolyte is a complex salt of phenanthroline with iron, ruthenium, or osmium ions, where the solvent is propylene carbonate and the electrolyte is a complex salt of dipyridyl with iron, ruthenium, or osmium ions, or where the solvent is propylene carbonate and the electrolyte is a complex salt of phenanthroline with iron, ruthenium, or osmium ions, the electrolytic solution similarly has a high degree of electric conductivity as in the case where the solvent is acetonitrile and the electrolyte is a complex salt of dipyridyl with iron ions.

The first embodiment of the light energy conversion system of the present invention is provided with a semiconductor photoelectric conversion structure 7 in addition to the above-said redox reaction chamber 1.

The semiconductor photoelectric conversion structure 7 comprises a first semiconductor layer 8 of a first conductivity type which is one of the P and N conductivity types, an I type second semiconductor layer 9 formed on the first semiconductor layer 8, and a third semiconductor layer 10 of a second conductivity type opposite that of the semiconductor layer 8 and formed on the layer 9.

Such a semiconductor photoelectric conversion structure 7 is formed, in practice, by a known CVD, reduced pressure CVD, or plasma CVD method on a light transparent conductive substrate 11. In this case, the light transparent conductive substrate 11 has a light transparent insulating substrate proper 12, a comb-shaped lead-out electrode 13 formed on the light transparent conductive substrate 11, and a light transparent conductive film 14 formed on the light transparent conductive substrate 11 to cover the lead-out electrode 13.

In this case, the light transparent insulating substrate 12 may be formed of glass. The light transparent conductive film 14 may be a combination of indium oxide and tin oxide, and the lead-out electrode 13 may be formed of aluminum.

The lead-out electrode 13 and the light transparent conductive film 14 constitute a first electrode 22, as described later.

In the case where the semiconductor photoelectric conversion structure 7 is formed by the aforementioned method, the semiconductor layers 8, 9 and 10 are each formed of a non-single crystal semiconductor, in particular, an amorphous semiconductor, or a semi-amorphous semiconductor containing microcrystals having a particle size on the order of 5 to 100 Å, or a microcrystalline or polycrystalline semiconductor.

The non-single crystal semiconductor forming the semiconductor layers 8, 9 and 10 may be non-single crystal silicon (Si), germanium silicide, silicon nitride ($Si_3N_{4-x}(0<x<4)$) or silicon carbide ($SI_xC_{1-x}(0<x<1)$). In particular, since the semiconductor layer 8 is on the side on which light is incident, the non-single crystal semiconductor forming the layer 8 may preferably be silicon nitride ($Si_3N_{4-x}$) or silicon carbide ($Si_xC_{1-x}$) having a relatively wide band gap energy Eg of 1.8 to 2.5 eV, as will be appreciated from the following description. It is also preferable, however, to employ for forming the semiconductor layer 8 amorphous or semiamorphous silicon having a band gap energy Eg of 1.6 to 1.9 eV for the reason that in the case of the incident light being sunlight, its light absorption coefficient in the short wavelength region from 3500 to 5000 Å is 10 to 30 times larger than that of the single crystal silicon. The semiconductor layer 8 can be formed as thin as 50 to 500 Å.

For the reason give above with respect to the semiconductor layer 8, it is preferable that the non-single crystal semiconductor forming the semiconductor layer 9 be of amorphous or semi-amorphous silicon. The semiconductor layer 9 can be formed to a thickness of 0.5 to 1 μm, in particular, 0.5 μm.

The non-single crystal semiconductor forming the semiconductor layer 10 may preferably be amorphous or semi-amorphous $Si_3N_{4-x}(0<x<4)$ or $Si_xC_{1-x}(0<x<1)$, in particular, amorphous or semi-amorphous $Si_3N_{4-x}(x=3.5$ to $3.95)$ or $Si_xC_{1-x}(x=0.2$ to $0.7)$ having a band gap energy Eg in the range of 1.8 to 2.8 eV because it is desirable that the semiconductor layer 10 be highly resistant (i.e., inert to redox reaction between it and the electrolytic solution contained in the cell 2B described later. The semiconductor layer 10 can be made as thin as 50 to 500 Å.

When the semiconductor layer 10 is of N conductivity type, it contains an N type impurity. As the N type impurity, there can be used any group VII element but it is preferable to employ antimony (Sb), arsenic (As) or phosphorous (P) on the ground that the semiconductor layer 10 can obtain a relatively high electric conductivity of $10^{-5}$ to $10^{-6}$ $(\Omega .cm)^{-1}$ with a relatively small amount of such N type impurity. In the case where the semiconductor layer 10 contains the N type impurity Sb, As, or P, its content can be selected to be 0.01 to 3 mol%.

When the conductivity type of the semiconductor layer 10 is P, type, it contains a P type impurity. As the P type impurity, there can be used any Group IIIA element but it is preferable to employ indium (In), gallium (Ga), or aluminum (Al) because the semiconductor layer 10 can obtain a relatively high electric conductivity with a relatively small amount of such P type impurity and because even if the above said elements are oxidized, they still remain conductive. In the case where the semiconductor layer 10 contains the P type impurity In, Ga, or Al, its content can be selected in the range of 0.01 to 3 mol%.

The semiconductor photoelectric conversion structure 7 is disposed so that, of its semiconductor layers 8, 9 and 10, only the surface of the semiconductor layer 10 on the side opposite that facing the semiconductor layer 9 makes contact with the electrolytic solution 4B contained in the cell 2B, as described below.

The outer marginal edge of the semiconductor photoelectric conversion structure 7 is covered with a liquid-tight insulating protective film 15. On the other hand, a window 17B is formed in an outer side wall 16B of the redox reaction chamber 1 on the side of the cell 2B.

The semiconductor photoelectric conversion structure 7 is disposed in the window 17B to close it, with the surface of the semiconductor layer 10 on the side opposite that facing the layer 9 held in contact with the electrolytic solution 4B contained in the cell 2B, the semiconductor structure 7 being fixedly attached to the window 17B through an adhesive binder 18B applied between the insulating protective film 15 and the inside of the window 17B. The semiconductor photoelectric conversion structure 7 forms a part of the outer side wall 16B of the cell 2B of the redox reaction chamber 1.

The first embodiment of the light energy conversion system of the present invention has a first electrode 21 in contact with the electrolytic solution 4A contained in the cell 2A, which electrode 21 is, for example, plate-shaped.

The first electrode 21 is disposed in contact with the electrolytic solution 4A, for instance, as follows:

A window 17A is formed in the outer side wall 16A of the redox reaction chambe 1 on the side of the cell 2A. The plate-shaped first electrode 21 is disposed in the window 17A to close it, with one side of the electrode 21 held in contact with the electrolytic solution 4A, the electrode 21 being fixedly attached to the window 17A through an adhesive binder 18A applied between the electrode 21 and the inside of the window 17A. The first electrode 21 forms a part of the outer side wall 16A of the redox reaction chamber 1 on the side of the cell 2A.

Furthermore, the first embodiment of the light energy conversion system of the present invention is provided with a second electrode 22 which is connected to the semiconductor layer 8 of the semiconductor photoelectric conversion structure 7 and is paired with the abovesaid first electrode 21. The second electrode 22 is formed, for instance, by the lead-out electrode 13 of the light transparent conductive film 14 described previously.

Moreover, the first embodiment of the light energy conversion system of the present invention includes a third electrode 35 which is connected with semiconductor layer 10 of the semiconductor photoelectric conversion structure 7 and is paired with electrode 21. The electrode 35 is formed, for example, by a comb or grid-shaped conductive film 36 deposited on the semiconductor layer 10. The conductive film 36 is covered with a protective film 37 so that it is not eroded by the electrolytic solution 2B contained in the cell 2B.

The first embodiment of the light energy conversion system of the present invention is further provided with means 23 for electrically interconnecting the first and second electrodes 21 and 22.

The electric connecting means 23 has, for example, switch 25 inserted in a lead wire 24 connected at one end to the lead-out electrode 13 forming the second electrode 22 and connected at the other end to the abovementioned electrode 21.

The above is a description of the first embodiment of the light energy conversion system of the present invention.

With such an arrangement of the light energy conversion system of the present invention as described above, when light 26 is incident on the semiconductor photoelectric conversion structure 7 through the light transparent conductive substrate 11, electric power is generated between the semiconductor layer 10 of the semiconductor photoelectric conversion structure 7 and the electrode 22.

The electrode 21 contacts the electrolytic solution 4A contained in the cell 2A of the redox reaction chamber 1 and the semiconductor layer 10 of the semiconductor photoelectric conversion structure 7, serving as an electrode paired with electrode 21, contacts the electrolytic solution 4B contained in the cell 2B of the redox reaction chamber 1.

Accordingly, by closing the switch 25 to electrically interconnect the electrodes 21 and 22, a first redox reaction which is either one of anodic oxidation and cathodic reduction occurs in cell 2A of the redox reaction chamber and, a second redox reaction occurs in cell 2B which is the reverse of the first redox reaction.

In the case where the conductivity type of the semiconductor layer 10 of the semiconductor photoelectric conversion structure 7 is N type, the voltage generated across the semiconductor layer 10 and the electrode 22 is positive on the side of the electrode 22 and negative on the side of the semiconductor layer 10. On the other hand, first and second ions of different amount of charge are present in the electrolytic solutions 4A and 4B contained in the cells 2A and 2B. This causes an anodic oxidation reaction to occur in cell 2A in consequence of which the first ions become third ions of greater charge than that prior to the occurrence of the anodic oxidation reaction. In cell 2B, a cathodic reduction reaction occurs and, as a result of this, the second ions become fourth ions of smaller charge than that prior to the occurrence of the cathodic reduction reaction. In this case, since the electrolytic solutions 4A and 4B communicate with each other, in terms of ions, through the ion bridge 3, ion transport takes place between the electrolytic solutions 4A and 4B so that the concentrations of the third and fourth ions respectively generated in the electrolytic solutions 4A and 4B are increased. Thus, the third and fourth ions are stored in cells 2A and 2B, respectively.

In the case where the electrolytic solutions 4A and 4B are such as expressed by the aforementioned formulae (5a), (5b), (6a), (6b), (7a) and (7b), that is, such as expressed by $M(R_3)X_2$, the ions $M(R)_3^{2+}$ and $M(R)_3^{3+}$ (or $M(R)_3^+$ and $M(R)_3^{2+}$) shown on the left sides of the aforesaid formulae (8a) and (8b) (or (9a) and (9b)) are present as the first and second ions in the electrolytic solutions 4A and 4B before the anodic oxidation and cathodic reduction reactions occur. Consequently, when an electric potential is developed between the semiconductor layer 10 of the semiconductor photoelectric conversion structure 7 and the electrode 22, making the side of the former negative relative to the latter, an anodic oxidation reaction takes place in cell 2A, in which the $M(R)_3^{2+}$ (or $M(R_3)^+$) ions as the first ions become $M(dipyridyl)_3^{3+}$ (or $M(dipyridyl)_3^{2+}$) as the third ions and are stored. In cell 2B, a cathodic reduction reaction takes place and the $M(R)_3^{3+}$ (or $M(R)_3^{2+}$) ions as the second ions become $M(dipyridyl)_3^{2+}$ (or $M(dipyridyl)_3^+$) as the fourth ions and are stored.

In the case where the semiconductor layer 10 of the semiconductor photoelectric conversion structure 7 has P type conductivity, the voltage generated across the semiconductor layer 10 and the electrode 22 is negative on the side of the electrode 22 relative to the semiconductor layer 10. Accordingly, a cathodic reduction reaction occurs in cell 2A, in consequence of which the second ions become fourth ions of smaller charge than that prior to the occurrence of the cathodic reduction reaction. In cell 2B, an anodic oxidation reaction occurs and the first ions become third ions of larger charge than that prior to the occurrence of the anodic oxidation reaction. Also in this case, since the electrolytic solutions 4A and 4B communicate with each other, in terms of ions, through the ion bridge 3, an ion transport takes place between the electrolytic solutions so that the concentrations of the fourth and third ions respectively generated in the electrolytic solutions 4A and 4B are increased. Thus, the fourth and third ions are stored in cells 2A and 2B, respectively.

After storing the third (or fourth) and fourth (or third) ions in the electrolytic solutions contained in the cells 2A and 2B of the redox reaction chamber 1 as described above, the switch 25 forming the aforesaid electric connecting means 23 is opened to disconnect the electrodes 21 and 22 from each other. If a load (not shown) is connected across the electrodes 21 and 35 via lead 45 and 46 respectively connected thereto and via a switch 47, then electric power can be supplied to the load. In this case, the third (or fourth) and fourth (or third) ions stored in the electrolytic solutions 4A and 4B gradually decrease, and the first and second ions in the electrolytic solutions 4A and 4B gradually increase correspondingly.

As described above, the first embodiment of the present invention exhibits a light energy converting function wherein light energy is converted into electric energy and the electric energy is then converted into chemical energy through the use of a redox reaction system, and then reconverted into electric energy through the use of said redox reaction system.

According to the first embodiment of the present invention, the semiconductor photoelectric conversion structure 7 and the redox reaction chamber 1 are formed as a unitary structure, with the semiconductor layer 10 held in contact with the electrolytic solution 4B contained in the cell 2B of the redox reaction chamber 1. Accordingly, the light energy conversion system of this embodiment can be made compact as compared with the conventional light energy conversion systems.

Furthermore, according to the first embodiment of the present invention, the only electrode which makes contact with the electrolytic solution in the redox reaction chamber 1 is electrode 21 in contact with the electrolytic solution 4A in the cell 2A of the redox reaction chamber 1. Moreover, the means for electrically interconnecting the semiconductor photoelectric conversion structure and the electrode in contact with the electrolytic solution in the redox reaction chamber are simply the means 23 for electrically connecting the electrodes 21 and 22 when converting electrical energy into chemical energy and electric connecting means including leads 45 and 46 and switch 47 which electrically connect electrodes 21 and 35 to the load when converting chemical energy into electrical energy.

Therefore, the first embodiment of the present invention is advantageous over the prior art systems in that the number of parts used is small and that the operation of electrically connecting the semiconductor photoelectric conversion structure and the electrode in contact with the electrolytic solution in the redox reaction chamber is less troublesome and time-consuming.

Moreover, according to the first embodiment of the present invention, voltage which is generated between the semiconductor layer 10 of the photoelectric conversion semiconductor structure 7 and the electrode 22 by incidence of light 26 can be obtained across the electrodes 22 and 35. Accordingly, by means of leads 43 and 44 from the electrodes 22 and 35, respectively, it is possible to convert the electrical energy generated in the semiconductor photoelectric conversion structure 7 into chemical energy while at the same time utilizing the electric energy outside the conversion system.

Next, a description will be given, with reference to FIG. 2, of a second embodiment of the light energy conversion system of the present invention, in which the parts corresponding to those in FIG. 1 are identified by the same reference numerals.

The second embodiment illustrated in FIG. 2 is identical in construction with the first embodiment of FIG. 1 except that the electrode 35 and the protective film 37 formed on part of the semiconductor layer 10 of the semiconductor photoelectric conversion structure 7 in FIG. 1 are omitted and the semiconductor layer 10 is covered with a metallic conductive layer 41, which is, in turn, covered with a semiconductor layer 42 of the same second conductivity type as that of the semiconductor layer 10, and a lead 44 is connected to the metallic conductive layer 41 used as a third electrode.

Accordingly, in the second embodiment of FIG. 2, only the semiconductor layer 42 is in contact with the electrolytic solution 4B contained in the cell 2B of the redox reaction chamber 1, instead of the semiconductor layer 10 of the photoelectric conversion semiconductor structure 7 in the first embodiment shown in FIG. 1.

In this case, the metallic conductive layer 41 forming a part of the semiconductor photoelectric conversion structure 7 can be formed by a known CVD, reduced pressure CVD, or plasma CVD method or, in some cases, by a vacuum evaporation method.

Moreover, the semiconductor layer 42 of the photoelectric conversion semiconductor structure 7 is formed by the known CVD, reduced pressure CVD, or plasma CVD method, as is the case with the other semiconductor layers 8, 9 and 10.

In the case where the semiconductor layer 42 is formed by the abovesaid method, it is formed of a non-single crystal semiconductor, in particular, an amorphous or semi-amorphous semiconductor. The semiconductor layer 42 makes contact with the electrolytic solution 4B in the cell 2B of the redox reaction chamber 1 and performs the redox reaction with the electrolytic solution as described previously with respect to FIG. 1; therefore, it is desirable that the semiconductor layer 42 be highly resistant (i.e., inert) to the redox reaction. For this reason, it is preferable that the semiconductor layer 42 be formed of amorphous or semi-amorphous $Si_3N_{4-x}(0<x<4)$ or $Si_xC_{1-x}(0<x<1)$, in particular, amorphous or semi-amorphous $Si_3N_{4-x}(x=3.5$ to $3.95)$ or $Si_xC_{1-x}(x=0.2$ to $0.7)$ which has a band gap energy Eg in the range of 1.8 to 2.8 eV. The semiconductor layer 42 can be made as thin as 50~500 Å.

Since the semiconductor layer 10 does not make direct contact with the electrolytic solution 4B in the cell 2B of the redox reaction chamber 1, it need not always be formed of the amorphous or semi-amorphous $Si_3N_{4-x}(0<x<4)$ or $Si_xC_{1-x}(0<x<1)$ as referred to previously with respect to FIG. 1, but may be made of amorphous or semi-amorphous silicon.

The structure comprising the semiconductor layer 10, metallic conductive layer 41, and semiconductor layer 42 forming the semiconductor photoelectric conversion structure 7 is equivalent, in terms of function, to the semiconductor layer 10 in the first embodiment described previously in connection with FIG. 1.

Accordingly, though not described in detail, the second embodiment of FIG. 2 also has the same excellent features as those obtainable with the first embodiment of FIG. 1.

With the second embodiment of the present invention, voltage generated across the electrode 22 and the semiconductor layer 10 of the photoelectric conversion semiconductor structure 7 by incidence of light 26 can be obtained across the electrode 22 and the metallic conductive layer 41.

Consequently, by means of leads 43 and 44 from the electrode 22 and the metallic conductive layer 41, respectively, it is possible to convert the electrical energy generated in the semiconductor photoelectric conversion structure 7 into chemical energy while at the same time utilizing the electric power outside the system.

Next, a description will be given, with reference to FIGS. 3 and 4, of third and fourth embodiments of the present invention, in which the parts corresponding to those in FIGS. 1 and 2 are identified by the same reference numerals.

The third and fourth embodiments of the present invention are identical in construction with the first and second embodiments of FIGS. 1 and 2 except the provision of electrolytic solution inlet means 30A and 30B for introducing fresh electrolytic solutions 4A' and 4B', respectively, into the cells 2A and 2B, respectively, of the redox reaction chamber 1 from the outside and electrolytic solution outlet means 32A and 32B, respectively, for withdrawing the electrolytic solutions 4A and 4B from the cells 2A and 2B to the exterior so as to enable storage of electrolytic solutions 4A" and 4B" having chemical energy converted from electrical energy.

Figure 4:
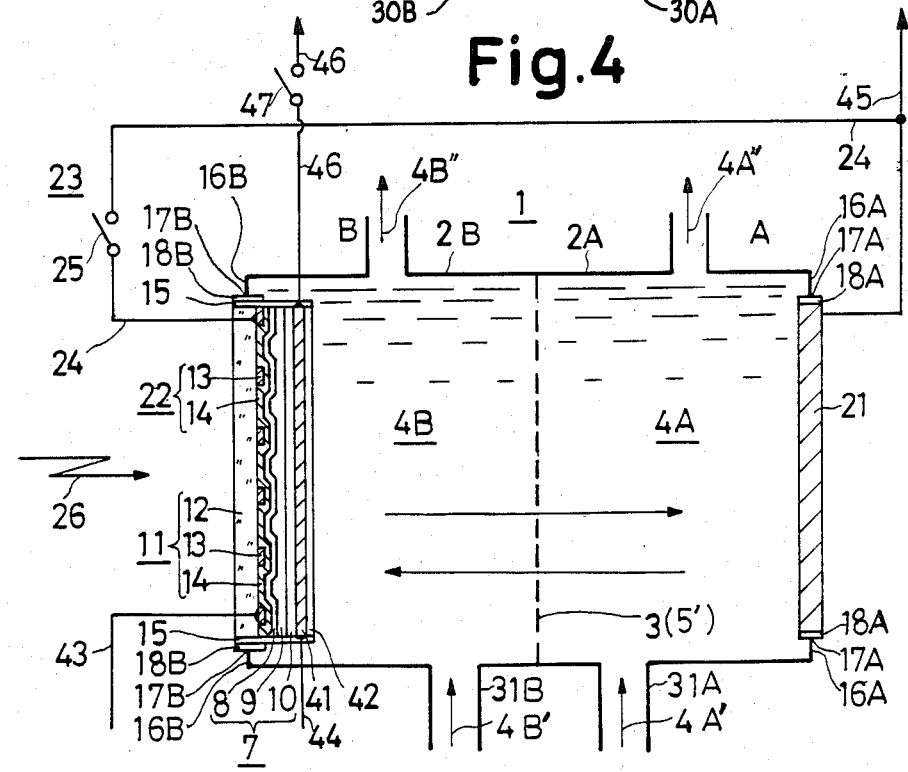
FIG. 4 is a sectional view schematically illustrating a fourth embodiment of the light energy conversion system of the present invention.

In the third and fourth embodiments shown in FIGS. 3 and 4, the electrolytic solution inlet means 31A and 31B include pipes 31A and 31B, respectively, which are formed integrally with the redox reaction chamber 1 to extend outwardly thereof, for example, from the bottoms of the cells 2A and 2B, respectively. The electrolytic solution outlet means 32A and 32B include pipes 33A and 33B extending outwardly from the upper portions of the cells 2A and 2B.

Accordingly, though not described in detail, the third and fourth embodiments of FIGS. 3 and 4 also possess the same excellent features as do the first and second embodiments shown in FIGS. 1 and 2.

Furthermore, in the third and fourth embodiments of the present invention, the electrolytic solutions 4A and 4B in the respective cells 2A and 2B of the redox reaction chamber 1 can be withdrawn therefrom by the electrolytic solution outlet means 32A and 32B so that the electrolytic solutions 4A and 4B are stored, outside the system, as the electrolytic solutions 4A" and 4B" which have chemical energy converted from electrical energy. The electrolytic solution inlet means 31A and 31B supply the electrolytic solutions 4A' and 4B' into the cells 2A and 2B of the redox reaction chamber 1 to make up for the amounts of electrolytic solutions 4A" and 4B" stored outside the system.

Accordingly, the third and fourth embodiments of FIGS. 3 and 4 possess the advantage that the electrolytic solutions having chemical energy converted from electrical energy can be stored outside the system in large quantities.

Incidentally, the foregoing embodiments should be construed as being merely illustrative of the present invention and it will be apparent that many modifications and variations maybe effected without departing from the spirit of the present invention.

For example, in each of the above-described embodiments of the present inventions, the semiconductor photoelectric conversion structure 7 may be also modified so that one PIN junction formed by the semiconductor layers 8, 9 and 10 is replaced with two or more such PIN junctions. In this case, since electric power of higher voltage than in the afore-described embodiments can be generated in the semiconductor photoelectric conversion structure 7, electrical energy can be converted into chemical energy with higher efficiency than in the foregoing embodiments described in the foregoing.

Moreover, in the foregoing embodiments of the present invention, it is also possible that the junctions between the semiconductor layers 8 and 9 and between 9 and 10 in the semiconductor photoelectric conversion structure 7 are made gradual as disclosed in U.S. Pat. No. 4,239,554, and that the semiconductor layer 8, on which the light 26 is incident, or the layers 8 and 9 are formed as so-called graded band gap type layers which have a wider band gap energy Eg than does the semiconductor layer 10 on the side opposite from which the light 26 is incident. In this case, a high photoelectric conversion efficiency can be obtained with the semiconductor photoelectric conversion structure 7.

What is claimed is:

1. A light energy conversion system comprising:
   a redox reaction chamber provided with first and second cells intercommunicating through an ion bridge and respectively containing first and second electrolytic solutions;
   a semiconductor photoelectric conversion structure having a first non-single crystalline semiconductor layer of a P or N first conductivity type, an I type non-single-crystalline semiconductor layer formed on the first non-single-crystalline semiconductor layer, and a heavily doped, third non-single crystalline semiconductor layer of a second conductivity type opposite that of the first conductivity type of the first non-single-crystalline semiconductor layer formed on the second non-single-crystalline semiconductor layer;
   a first electrode in contact with the first electrolytic solution contained in the first cell of the redox reaction chamber;
   a second electrode connected to the first non-single crystalline semiconductor layer of the semiconductor photoelectric conversion structure and forming a first electrode pair with the first electrode;
   a third electrode at least partly covering the third non-single crystalline semiconductor layer of the semiconductor photoelectric conversion structure and forming a second electrode pair with the first electrode; and
   means for electrically interconnecting the first and second electrodes; and means for connecting a load between the second electrode pair to supply electric power to the load; and wherein the semiconductor photoelectric conversion structure is provided in the second cell of the redox chamber (a) so that it forms a part of the cell wall, (b) so that light is incident on the semiconductor photoelectric conversion structure directly without passing through the second electrolytic solution in the second cell, and (c) so that only the third non-single-crystalline semiconductor layer of the semiconductor photoelectric conversion structure is held in contact with the second electrolytic solution.

2. A light energy conversion system according to claim 1 wherein the third non-single-crystalline semiconductor layer of the semiconductor photoelectric conversion structure is formed of Si, germanium silicide, $Si_3N_{4-x}(0<x<4)$, or $Si_xC_{1-x}(0<x<1)$.

3. A light energy conversion system according to claim 2 wherein the conductivity type of the third non-single crystalline semiconductor layer is N type, and wherein the third non-single-crystalline semiconductor layer contains 0.01 to 3 mol% of Sb, As, or P as an N type impurity.

4. A light energy conversion system according to claim 2 wherein the conductivity type of the third non-single-crystalline semiconductor layer is P type, and wherein the third non-single-crystalline semiconductor layer contains 0.01 to 3 mol% of In, Ga, or Al as a P type impurity.

5. A light energy conversion system according to any one of claims 1 to 4 wherein the first and second electrolytic solutions contained in the first and second cells of the redox reaction chamber are of different kinds.

6. A light energy conversion system according to claim 5 which further comprises first and second electrolytic solution inlet means for introducing the first and second electrolytic solutions of different kinds into the first and second cells of the redox reaction chamber, and first and second electrolytic outlet means for withdrawing the first and second electrolytic solutions from the first and second cells.

7. A light energy conversion system according to any one of claims 1 to 4 wherein the first and second electrolytic solutions contained in the first and second cells of the redox reaction chamber are of the same kind.

8. A light energy conversion system according to claim 7 which further comprises first and second electrolytic solution inlet means for introducing the first and second electrolytic solutions of the same kind into the first and second cells of the redox reaction chamber, and first and second electrolytic solution outlet means for withdrawing the first and second electrolytic solutions from the first and second cells.

9. A light energy conversion system according to any one of claim 1 to 4 wherein the first and second electrolytic solutions each include, a nonaqueous solvent consisting of acetonitrile or propylene carbonate and, as an electrolyte, a complex salt including dipyridyl or phenanthroline, and metal ions.

10. A light energy conversion system according to claim 9 wherein the metal ions included in the electrolyte are iron, ruthenium, or osmium ions.

11. A light energy conversion system according to claim 9 wherein the electrolyte is $MR_3X_2$ where M is iron, ruthenium, or osmium, R is dipyridyl or phenanthroline, and X is $ClO_4$.

* * * * *